(12) United States Patent
Qin et al.

(10) Patent No.: US 11,417,930 B2
(45) Date of Patent: Aug. 16, 2022

(54) MOUNTING STAND, BATTERY ASSEMBLY, AND ENERGY STORAGE SYSTEM INCLUDING THE SAME

(71) Applicant: Dongguan Amperex Technology Limited, Dongguan (CN)

(72) Inventors: Lei Qin, Dongguan (CN); Pengcheng Yang, Dongguan (CN); Xin Wang, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 219 days.

(21) Appl. No.: 16/652,734

(22) PCT Filed: Mar. 31, 2020

(86) PCT No.: PCT/CN2020/082355
§ 371 (c)(1),
(2) Date: Apr. 1, 2020

(87) PCT Pub. No.: WO2021/042709
PCT Pub. Date: Mar. 11, 2021

(65) Prior Publication Data
US 2021/0408631 A1 Dec. 30, 2021

(30) Foreign Application Priority Data
Sep. 2, 2019 (CN) .......................... 201910824283.4

(51) Int. Cl.
*H01M 50/244* (2021.01)
*H01M 10/42* (2006.01)
(Continued)

(52) U.S. Cl.
CPC ....... *H01M 50/244* (2021.01); *H01M 10/425* (2013.01); *H01M 50/204* (2021.01); *H01M 50/247* (2021.01); *H01M 2010/4271* (2013.01)

(58) Field of Classification Search
CPC ............. H01M 50/244; H01M 50/247; H01M 50/204; H01M 10/425; H01M 2010/4271
See application file for complete search history.

(56) References Cited

U.S. PATENT DOCUMENTS

| | | | |
|---|---|---|---|
| 2010/0072334 A1* | 3/2010 | Le Gette | F16M 11/10 29/428 |
| 2018/0110145 A1* | 4/2018 | Choi | H05K 5/0234 |
| 2019/0058173 A1* | 2/2019 | Kim | H01M 50/256 |

FOREIGN PATENT DOCUMENTS

| CN | 201228838 Y | 4/2009 |
|---|---|---|
| CN | 102221124 A | 10/2011 |

(Continued)

OTHER PUBLICATIONS

CN 207690171 MT (Year: 2018).*
(Continued)

*Primary Examiner* — Alexander Usyatinsky
(74) *Attorney, Agent, or Firm* — Ladas & Parry LLP (57) ABSTRACT

The present disclosure provides a mounting stand which is configured for mounting a component on the floor or on the wall comprising a bracket, at least two rotating rackets connected to the fixing bracket separately and being on opposite sides of the fixing bracket, and a back plate detachably disposed on the fixing bracket and the at least two rotating brackets. The present disclosure further provides a battery assembly and an energy storage system comprising the mounting stand. The mounting stand is adapted for conveniently accepting a floor-mounted method and a wall-mounted method.

18 Claims, 5 Drawing Sheets

(51) Int. Cl.
    *H01M 50/247*     (2021.01)
    *H01M 50/204*     (2021.01)

(56)     References Cited

FOREIGN PATENT DOCUMENTS

| | | | |
|---|---|---|---|
| CN | 204258695 U | | 4/2015 |
| CN | 205372017 U | | 7/2016 |
| CN | 206947415 U | | 1/2018 |
| CN | 207690171 U | | 8/2018 |
| CN | CN 207690171 | * | 8/2018 |
| JP | H09306448 A | | 11/1997 |
| JP | 2011049181 A | | 3/2011 |
| JP | 2018176961 A | | 11/2018 |
| JP | 2019202639 A | | 11/2019 |
| WO | 2014/055128 A1 | | 4/2014 |
| WO | WO 2018093018 | * | 5/2018 |

OTHER PUBLICATIONS

201910824283,Notification_to_Grant_Pate . . . _Invention_ (Translated),Jan. 10, 2022 (Year: 2022).*
Australian Office Action dated May 31, 2021.
Chinese Office Action dated Aug. 6, 2021.
Chinese Office Action dated Sep. 23, 2021.
Japanese Office Action corresponding to counterpart application 2020-518632 dated Dec. 14. 2021.
PAT201905013AU1_Notice_of_Acceptance_2_Feb_2022.

* cited by examiner

MOUNTING STAND, BATTERY ASSEMBLY, AND ENERGY STORAGE SYSTEM INCLUDING THE SAME

FIELD

The subject matter herein generally relates to a mounting stand, a battery assembly including the mounting stand, and an energy storage system including the battery assembly.

BACKGROUND

A mounting stand is configured for mounting a component to be installed, such as a battery module or a computer case, to a mounting point, such as a floor or a wall surface. An ordinary mounting method includes a floor-mounted method or a wall-mounted method, etc. However, an ordinary mounting stand is mounted by the floor-mounted method or the wall-mounted method, such mounting stand cannot meet a requirement of flexible combination in multiple scenarios, and cannot be used in different scenarios, which brings inconvenience to construction and installation.

SUMMARY

What is needed, is a mounting stand of which a mounting method can flexibly change between floor-mounted method and wall-mounted method according to environment.

In addition, a battery assembly including the above mounting stand is further needed.

In addition, an energy storage system including the above battery assembly is further needed.

The present disclosure provides a mounting stand for mounting a component, including a fixing bracket, at least two rotating brackets, separately and rotatably connected to the fixing bracket and located on opposite sides of the fixing bracket; and a back plate detachably disposed on the fixing bracket and the at least two rotating brackets.

Furthermore, each of the at least two rotating brackets has a notch, the back plate is provided with at least two positioning pins. The at least two positioning pins are capable of engaging with the notches of the at least two rotating brackets to make the at least two rotating brackets connect to the back plate.

Furthermore, the mounting stand further includes at least two bolts, when the rotating brackets are disconnected from the back plate, the at least two bolts are configured to fasten the at least two rotating brackets to a wall surface through the notches of the at least two rotating brackets.

Furthermore, each rotating bracket includes a first connecting portion, a second connecting portion perpendicularly protruding from an end of the first connecting portion, and an extending portion bending and extending from an end of the second connecting portion away from the first connecting portion. When the first connecting portion is rotated to a horizontal direction, the component to be installed is sandwiched between the extending portions of the two rotating brackets.

Furthermore, the fixing bracket includes a fixing frame and a hook disposed on the fixing frame, the back plate has a slot matching with the hook, the hook can engage with the slot.

Furthermore, the fixing bracket further includes a reinforcing plate arranged on the fixing frame.

Furthermore, the hook includes two groups of hooks, the first group of hooks is disposed on a top of the fixing frame, and the second group of hooks is disposed on the reinforcing plate.

Furthermore, the fixing frame, the hook, and the reinforcing plate are integrally formed. The first group of hooks is formed by bending the top of the fixing frame, and the second group of hooks is formed by bending the top of a reinforcing plate.

Furthermore, the mounting stand further includes a support base, the support base includes a mounting portion and a support portion perpendicularly disposed on an end of the mounting portion, the mounting portion is connected to a bottom of the fixing frame.

Furthermore, the support portion has an outlet.

The present disclosure further provides a battery assembly including a battery module and one of the above mounting stands, the mounting stand is configured for mounting the battery assembly.

The present disclosure further provides an energy storage system including the above battery assembly, a battery management system, and an electrical equipment. The battery module is electrically connected to the battery management system and the electrical equipment, and configured to supply power to the electrical equipment under a control of the battery management system.

The mounting stand, the battery assembly, and the energy storage system of the present disclosure can be floor-mounted by a cooperation of the fixing bracket and the rotating brackets. The above stands can also be wall-mounted by a cooperation of the fixing bracket, the rotating brackets, and the back plate, so that users can flexibly change a mounting method between the floor-mounted method and the wall-mounted method according to environment.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings and following descriptions show merely some embodiments of the present invention, and a person of ordinary skill in the art may still derive other drawings from these accompanying drawings without creative efforts.

DETAILED DESCRIPTION

The technical solutions of the present disclosure will be described in more detail below in combination with the drawings in the embodiments of the present disclosure. It should be appreciated that embodiments described herein are only some rather than all of the embodiments of the present disclosure. All other embodiments obtained by those having ordinary skills in the art on the basis of the embodiments of the present disclosure without any inventive efforts fall within the protection scope of the present disclosure.

It is noted that, terms used herein in the specification of the present disclosure are only for the purpose of describing specific embodiments, and not intended to limit the present disclosure. When one component is considered as "being connected to" another component, the one component may be connected directly to the other component or an intermediate component might be present simultaneously. When a component is referred to as "being disposed on" another component, the component may be disposed on the other component or an intermediate component might be present simultaneously. As used herein, term 'top' and similar expressions are only for illustrative purposes. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
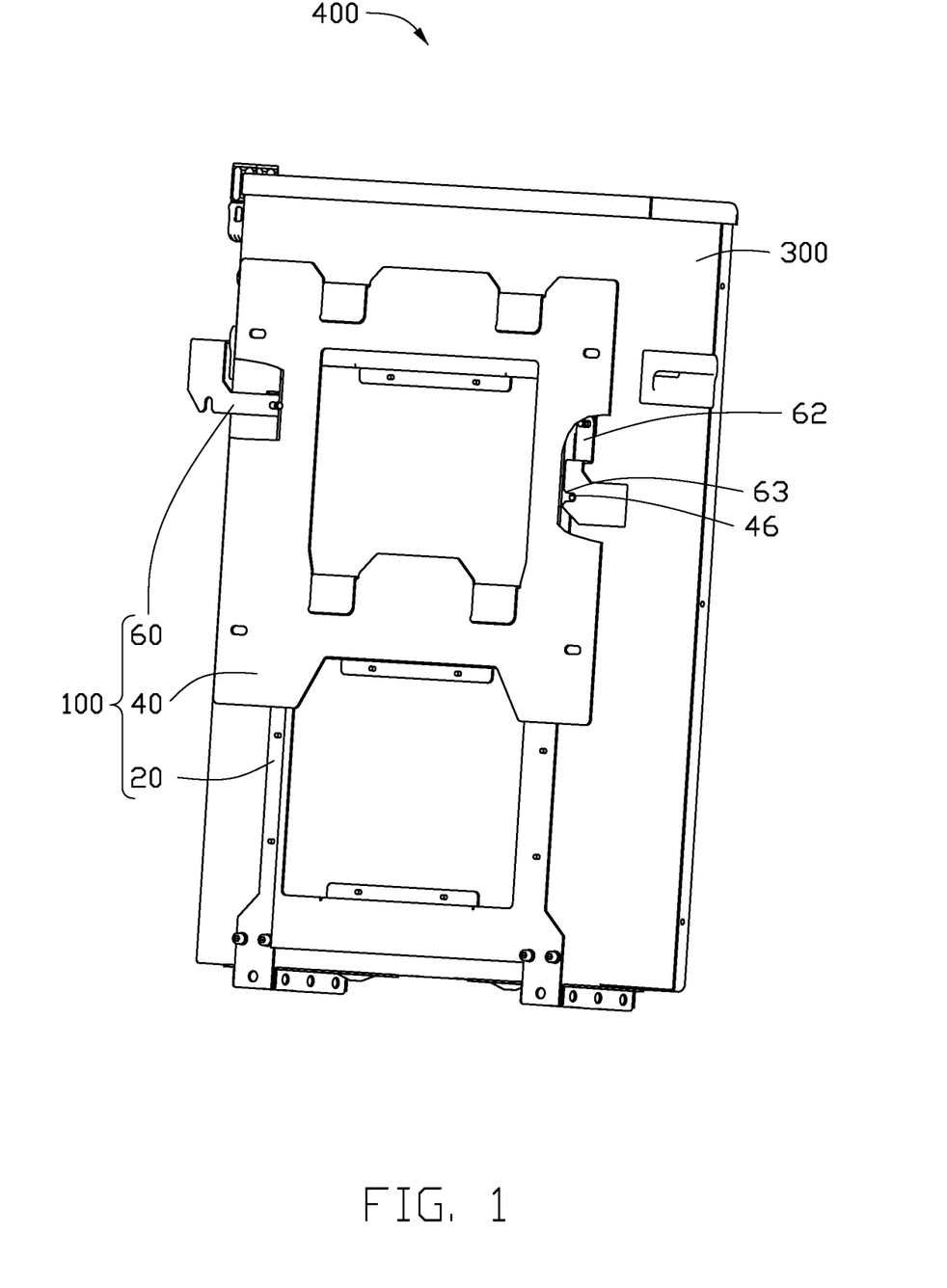
FIG. 1 is an isometric view of an embodiment of a battery assembly of the present disclosure.

Referring to FIG. 1, a battery assembly 400 of the present disclosure is shown in one embodiment, in which a portion of a back plate 40 of a mounting stand 100 is removed to expose two rotating brackets 60. The battery assembly 400 includes a mounting stand 100 and a battery module 300. The mounting stand 100 is configured for mounting the battery module 300 on a floor or to a wall surface. The battery module 300 is supported on the mounting stand 100.

The mounting stand 100 includes a fixing bracket 20, two rotating brackets 60, and a back plate 40. The two rotating brackets 60 are separately and rotatably connected to the fixing bracket 20, and located on opposite sides of the fixing bracket 20. The back plate 40 is detachably disposed on the fixing bracket 20 and the two rotating brackets 60. It is to be understood, the mounting stand 100 can also be configured for mounting a computer case and other components to be installed.

Figure 2:
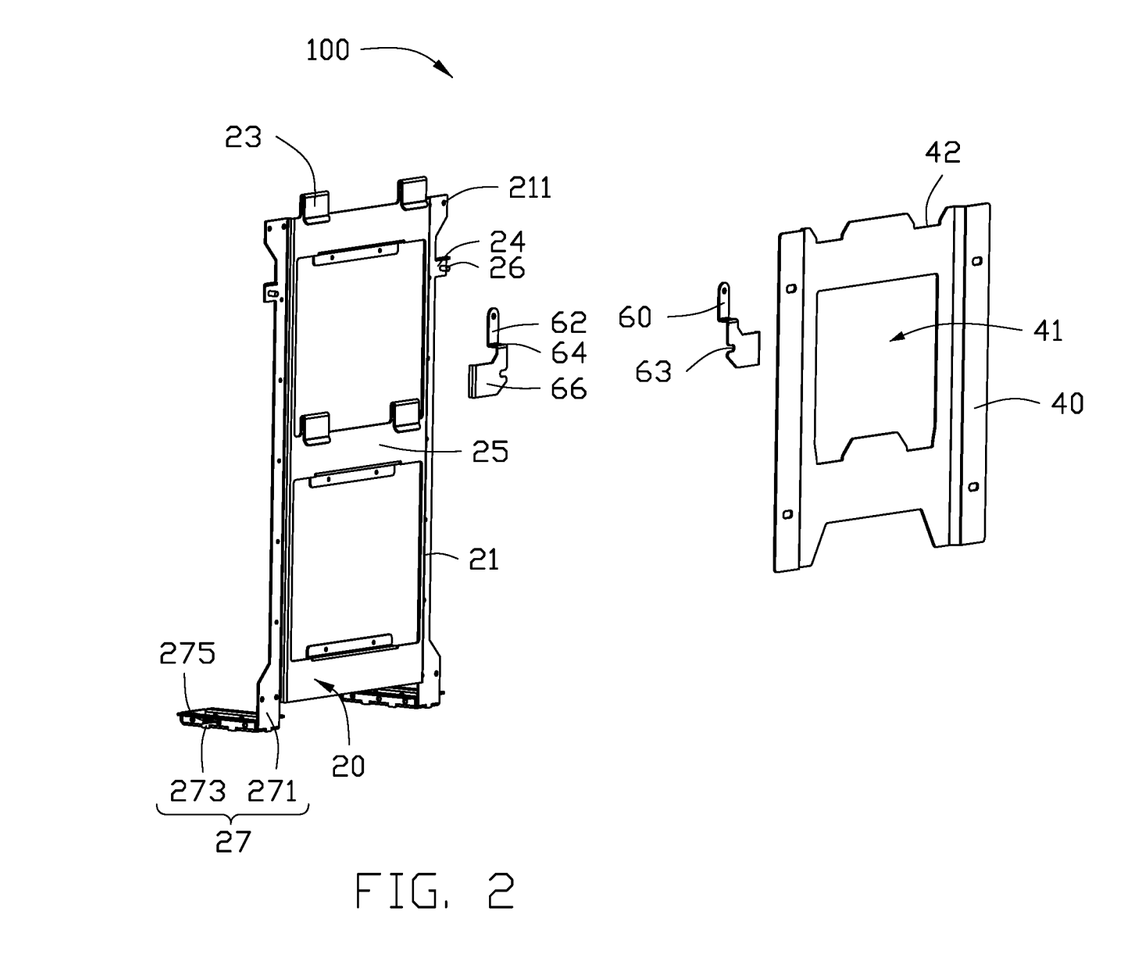
FIG. 2 is an exploded, isometric view of a mounting stand in the assembly of FIG. 1.

Referring to FIG. 2, an exploded isometric view of the mounting stand 100 is shown, in which the back plate 40 is unbroken. The fixing bracket 20 is configured for mounting the battery module, and can be connected to a housing of the battery module by bolting, welding, or the like. The fixing bracket 20 includes a fixing frame 21, a hook 23, and a reinforcing plate 25. The hook 23 and the reinforcing plate 25 are disposed on the fixing frame 21. The fixing frame 21 is substantially a rectangular frame, and has a plurality of first connecting holes 211 for bolts to pass through to connect the fixing frame 21 and the battery module. The reinforcing plate 25 is disposed at a substantially central position of the fixing frame 21, and connects two opposite sides of the fixed frame 21 to increase a rigidity of the fixing frame 21. In this embodiment, there are four hooks, and the four hooks are arranged in two groups on the fixing frame 21 and the reinforcing plate 25. The first group of hooks 23 is disposed on a top of the fixing frame 21, the second group of hooks 23 is disposed on the reinforcing plate 25. It is to be understood, in other embodiments, the number of the hooks 23 may be two, three, or more than four, and the hooks 23 may be divided into more than two groups to be disposed on the fixing frame 21, the hooks 23 are configured for fixing the back plate 40. In this embodiment, the fixing frame 21, the hooks 23, and the reinforcing plate 25 are integrally formed, wherein the first group of hooks 23 is formed by bending a top of the fixing frame 21, and the second group of hook 23 is formed by bending a top of the reinforcing plate 25. It is to be understood, in other embodiments, the fixing frame 21, the hooks 23 and the reinforcing plate 25 can also be separately molded and then assembled to form the fixing bracket 20.

Furthermore, the fixing bracket 20 further includes a support base 27 disposed on a bottom of the fixing frame 21. The support base 27 is configured to support the battery module. The support base 27 is substantially L-shaped. The support base 27 and the fixing frame 21 cooperatively form a receiving space for receiving the battery module. In this embodiment, the number of the support bases 27 is two. Each support base 27 includes a mounting portion 271 and a support portion 273 perpendicularly disposed on an end of the mounting portion 271 away from the fixing frame 21. The mounting portion 271 is substantially plate-shaped. The support portion 273 includes a bottom plate and three lateral plates disposed on three side edges of the bottom plate. The three lateral plates and the mounting portion 271 surround the bottom plate to form a rectangular block structure with a single opening. The three lateral plates are not connected to each other, and a slit is formed between the side edges of two adjacent lateral plates to allow water accumulation in the rectangular block structure to flow out. Each of the bottom plate and the lateral plates has an outlet 275. In this embodiment, the support base 27 is formed by bending a metal plate. In this embodiment, the number of the outlets 275 on each plate is two to four. It is to be understood, the number of the support bases 27 and the number of the outlet 275 are not limited to the above embodiments, and they can be designed according to actual needs. In other embodiments, the outlet 275 may only be disposed on the bottom plate or the lateral plate, and the three lateral plates may be connected to each other.

Furthermore, two protrusions 24 are arranged on two sides of the fixing frame 21. The two protrusions 24 perpendicularly protrude from two sides of the fixing frame 21, and extend out of the fixing frame 21 along a width direction of the fixing frame 21. The protrusion 24 has a mounting hole.

Furthermore, the mounting stand 100 further includes two bolts 26 for insertion into the mounting holes and configured for connect the fixing bracket 20 and the rotating bracket 60. The bracket 60 has mounting holes for the bolts to pass through.

Figure 3:
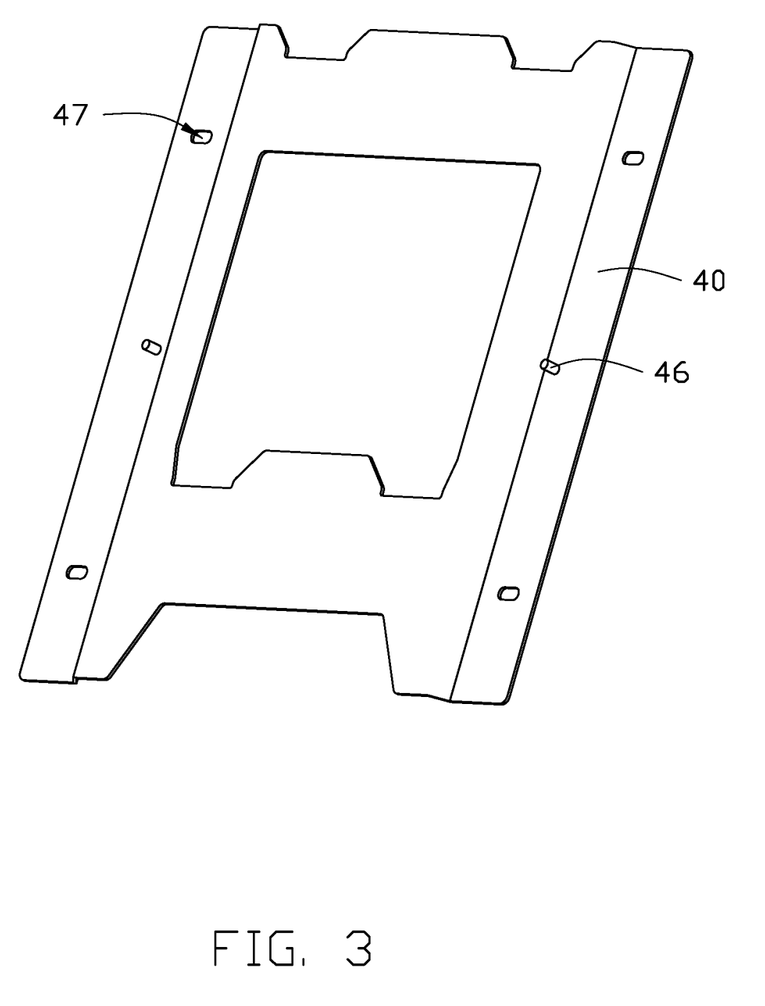
FIG. 3 is a back view of a back plate of the mounting stand of FIG. 2.

Referring to FIG. 3, the mounting stand 100 further includes two nuts 80 which are screwed to the bolts 26 and are located on a side of the rotating bracket 60 away from the fixing bracket 20. By controlling a rotation of the nut 80, a tightness of the connection between the rotating bracket 60 and the fixing bracket 20 is adjusted, so as to realize the rotation and fixing of the rotating bracket 60.

Referring to FIG. 2 again, the rotating bracket 60 includes a first connecting portion 62, a second connecting portion 64, and an extending portion 66 which are connected in that order. The first connecting portion 62 is connected to the fixing bracket 20 through the slot 26. The second connecting portion 64 vertically protrudes from an end of the first connecting portion 62. The extending portion 66 is substantially L-shaped, and bends and extends from an end of the second connecting portion 64 away from the first connecting portion 62.

When the first connecting portion 62 of the rotating bracket 60 is rotated to a horizontal direction, the rotating bracket 60 is disconnected from the back plate 40, and the battery module is sandwiched between the extending portions 66 of the two rotating brackets 60. The extending portion 66 has a notch 63 on a side edge facing the fixing bracket 20, for limiting the bolts connecting the rotating bracket 60 and a wall surface. One end of the bolt passes through the notch 63 and is inserted into the wall surface to fix the rotating bracket 60 and the fixing bracket 20 to the wall surface.

It is to be understood, the connection manner between the rotating bracket 60 and the fixing bracket 20 is not limited to the above-mentioned screw connection manner, and the rotating bracket 60 can be rotatably connected to the fixing bracket 20 by a hinge or a rotating shaft.

The back plate 40 is substantially plate-shaped, and has a slot 42 matching with the hook 23. Specifically, the back plate 40 has a through hole 41 at a substantially central position, a top of the back plate 40 and a bottom wall of the through hole 41 are respectively cut to form two slots 42, which match the two groups of hooks 23. The slot 42 of the back plate 40 is engaged with the hook 23, and the hook 23 limits a vertical movement of the back plate 40.

Referring to FIGS. 1 and 3, the back plate 40 carries two positioning pins 46. In a case where the rotating brackets 60 are connected to the back plate, the two positioning pins 46 match with the notches 63 of the rotating brackets 60, and configured to engage with the corresponding notches 63 to limit a horizontal movement of the back plate 40. When the first connecting portion 62 of the rotating bracket 60 is rotated to a horizontal direction, the notch 63 is engaged with a corresponding positioning pin 46 on the back of the back plate 40, so that the rotating bracket 60 is connected to the back plate 40. The back plate 40 further has a plurality of second connecting holes 47, for bolts to pass through to connect the wall surface.

Figure 4:
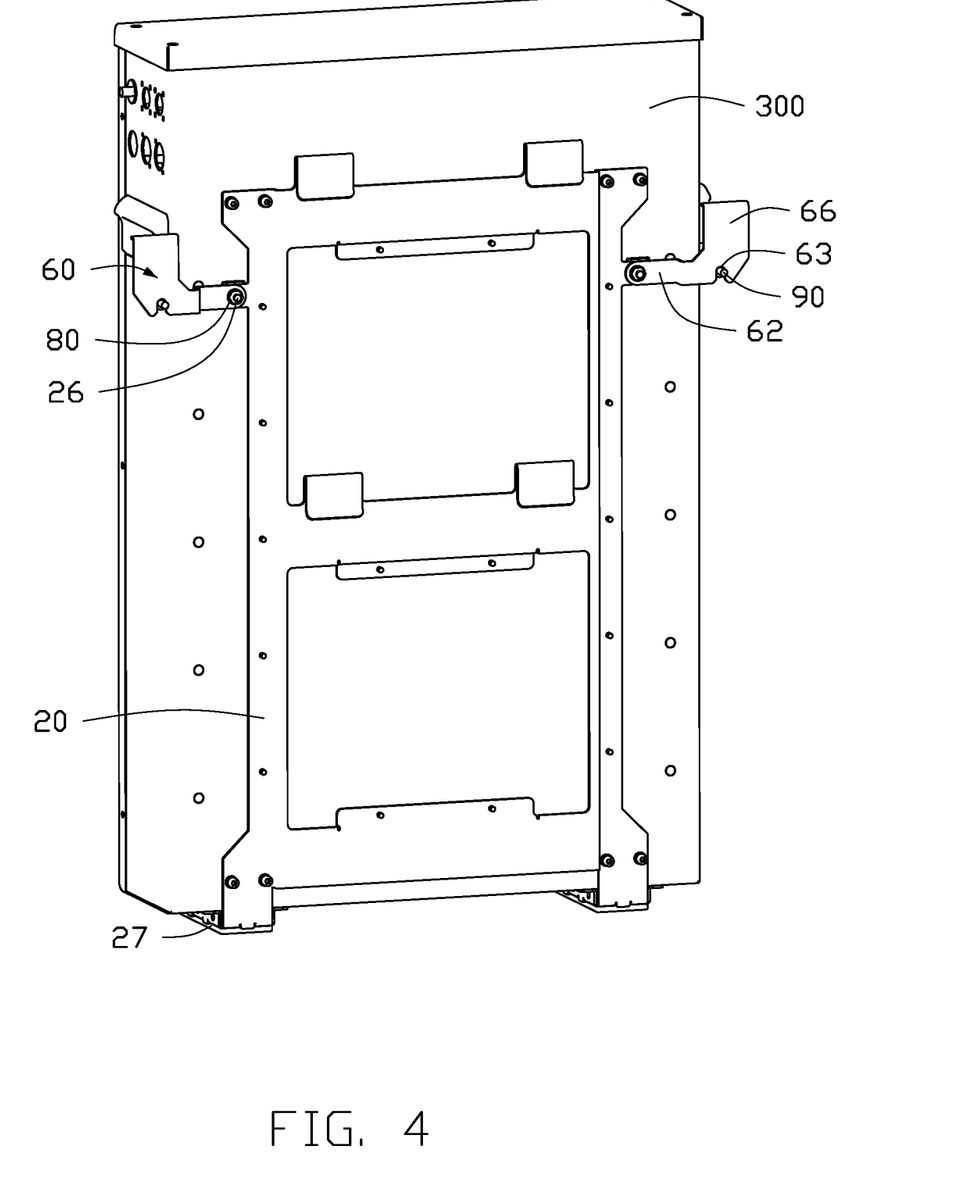
FIG. 4 is a schematic view of a mounting stand that is floor-mounted.

Referring to FIG. 4, during mounting the battery module 300 on a floor, first, the battery module 300 is placed on the support base 27 and the fixing bracket 20 is connected to the battery module 300. Second, the nuts 80 are adjusted to loosen the rotating brackets 60, and the first connecting portions 62 of the rotating brackets 60 are rotated to a horizontal direction to sandwich the battery module 300 between the extending portions 66 of the two rotating brackets 60. Finally, the bolts 90 are fixed on the wall surface through the notches 63. In this way, the battery module 300 is mounted on the floor.

Figure 5:
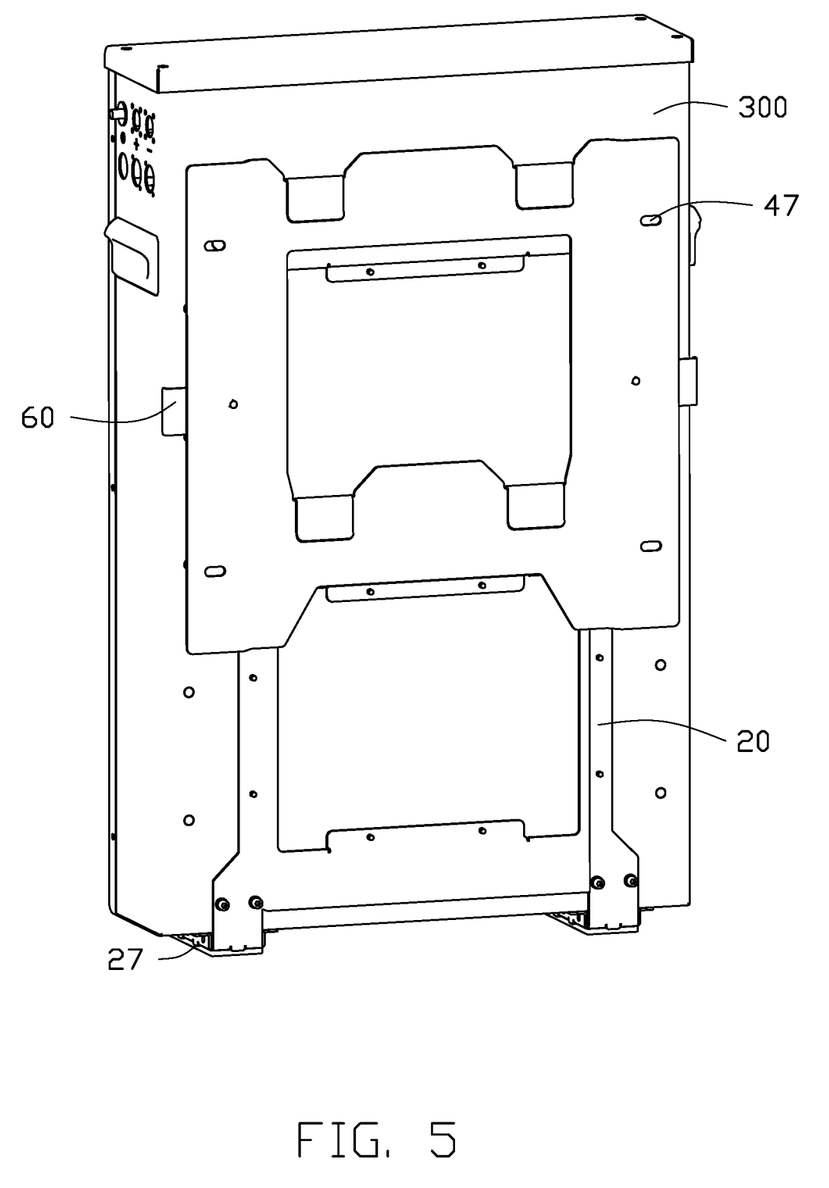
FIG. 5 is a schematic view of a mounting stand that is wall-mounted.

Referring to FIGS. 1 and 5, during mounting the battery module 300 on a wall surface, first, the battery module 300 is placed on the support base 27 and the fixing bracket 20 is connected to the battery module. Second, the nuts are adjusted to loosen the rotating brackets 60, and the first connecting portions 62 of the rotating brackets 60 are rotated to a vertical direction to engage the notches 63 of the two rotating brackets 60 with the positioning pins 46 of the back plate 40. Finally, the bolts are fixed on the wall surface through the second connecting holes 47 of the back plate 40. In this way, the battery module 300 is mounted on the wall surface.

The present disclosure further provides an energy storage system including a plurality of battery assemblies 400, a battery management system, and an electrical equipment. The battery modules 300 of the plurality of battery assemblies 400 are connected in series, and are electrically connected to the battery management system and the electrical equipment, respectively. The battery modules 300 are configured to supply power to the electrical equipment under a control of the battery management system.

The mounting stand 100 of the present disclosure is floor-mounted by a cooperation of the fixing bracket 20 and the rotating brackets 60, and can be wall-mounted by a cooperation of the fixing bracket 20, the rotating brackets 60, and the back plate 40. A user can flexibly change a mounting method between the floor-mounted method and the wall-mounted method according to environment.

Moreover, when the mounting stand 100 is floor-mounted, the support base 27 supports the component to be installed, which suspends a housing of the component above the floor, thereby preventing the housing from being polluted by dust or moisture, the housing being protected. In addition, the support base 27 has an outlet 275. When there is water on the floor for any reason, water can flow out through the outlet 275, thereby avoiding dangers of water accumulation. In addition, the back plate 40 is detachably connected to the fixing bracket 20 and the rotating brackets 60 through the hooks 23, slots 42 match with the hooks 23 and the positioning pins 46, the notches 63 match with the positioning pins 46, bolts are not required, it is easy to assemble or disassemble the mounting stand 100.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A mounting stand configured for mounting a component, comprising:
   a fixing bracket;
   at least two rotating brackets each rotatably connected to the fixing bracket and being on opposite sides of the fixing bracket; and
   a back plate detachably disposed on the fixing bracket;
   wherein each rotating bracket has a notch, when the rotating bracket is rotated to a first position, the notch is engaged with a positioning pin on the back plate, and when the rotating bracket is rotated to a second position, the notch is disengaged with the positioning pin, so as to allow a bolt to fasten the rotating bracket to a wall surface through the notch.

2. The mounting stand of claim 1, further comprising at least two bolts, wherein when the at least two rotating brackets are disengaged from the back plate, the at least two bolts are configured to fasten the at least two rotating brackets to a wall surface through the notches of the at least two rotating brackets.

3. The mounting stand of claim 1, wherein each of the at least two rotating brackets comprises a first connecting portion, a second connecting portion perpendicularly protruding from an end of the first connecting portion, and an extending portion bending and extending from an end of the second connecting portion away from the first connecting portion, when the first connecting portion is rotated to a horizontal direction, the component is sandwiched between the extending portions of the at least two rotating brackets.

4. The mounting stand of claim 1, wherein the fixing bracket comprises a fixing frame and a hook disposed on the fixing frame, the back plate has a slot matching with the hook, the hook is engaged with the slot.

5. The mounting stand of claim 4, wherein the fixing bracket further comprises a reinforcing plate arranged on the fixing frame.

6. The mounting stand of claim 5, wherein the hook comprises two groups of hooks, the first group of hooks is disposed on a top of the fixing frame, the second group of hooks is disposed on the reinforcing plate.

7. The mounting stand of claim 6, wherein the fixing frame, the hook, and the reinforcing plate are integrally formed, the first group of hooks is formed by bending the top of the fixing frame, and the second group of hooks is formed by bending a top of the reinforcing plate.

8. The mounting stand of claim 4, further comprising a support base comprising a mounting portion and a supporting portion perpendicularly disposed on an end of the mounting portion, the mounting portion being connected to a bottom of the fixing frame.

9. The mounting stand of claim 8, wherein the support portion has an outlet.

10. A battery assembly comprising a battery module and a mounting stand being configured for mounting the battery module, the mounting stand comprising:
 a fixing bracket;
 at least two rotating brackets each rotatably connected to the fixing bracket and being on opposite sides of the fixing bracket;
 and a back plate detachably disposed on the fixing bracket;
 wherein each rotating bracket has a notch, when the rotating bracket is rotated to a first position, the notch is engaged with a positioning pin on the back plate, and when the rotating bracket is rotated to a second position, the notch is disengaged with the positioning pin, so as to allow a bolt to fasten the rotating bracket to a wall surface through the notch.

11. An energy storage system comprising:
 a battery module mounted on a mounting stand,
 a battery management system, and
 an electrical equipment,
 wherein the battery module is electrically connected to the battery management system and the electrical equipment, and configured to supply power to the electrical equipment under a control of the battery management system,
 wherein the mounting stand comprises:
 a fixing bracket;
 at least two rotating brackets each rotatably connected to the fixing bracket and being on opposite sides of the fixing bracket; and
 a back plate detachably disposed on the fixing bracket;
 wherein each rotating bracket has a notch, when the rotating bracket is rotated to a first position, the notch is engaged with a positioning pin on the back plate, and when the rotating bracket is rotated to a second position, the notch is disengaged with the positioning pin, so as to allow a bolt to fasten the rotating bracket to a wall surface through the notch.

12. The battery assembly of claim 10, wherein the mounting stand further comprises at least two bolts, wherein when the at least two rotating brackets are disengaged from the back plate, the at least two bolts are configured to fasten the at least two rotating brackets to a wall surface through the notches of the at least two rotating brackets.

13. The battery assembly of claim 1, wherein each of the at least two rotating brackets comprises a first connecting portion, a second connecting portion perpendicularly protruding from an end of the first connecting portion, and an extending portion bending and extending from an end of the second connecting portion away from the first connecting portion, when the first connecting portion is rotated to a horizontal direction, the component is sandwiched between the extending portions of the at least two rotating brackets.

14. The battery assembly of claim 10, wherein the fixing bracket comprises a fixing frame and a hook disposed on the fixing frame, the back plate has a slot matching with the hook, the hook is engaged with the slot.

15. The battery assembly of claim 14, wherein the fixing bracket further comprises a reinforcing plate arranged on the fixing frame.

16. The battery assembly of claim 15, wherein the hook comprises two groups of hooks, the first group of hooks is disposed on a top of the fixing frame, the second group of hooks is disposed on the reinforcing plate.

17. The battery assembly of claim 16, wherein the fixing frame, the hook, and the reinforcing plate are integrally formed, the first group of hooks is formed by bending the top of the fixing frame, and the second group of hooks is formed by bending a top of the reinforcing plate.

18. The battery assembly of claim 14, wherein the mounting stand further comprises a support base comprising a mounting portion and a supporting portion perpendicularly disposed on an end of the mounting portion, the mounting portion being connected to a bottom of the fixing frame.

* * * * *